United States Patent

Hyakumura

[11] 4,130,349
[45] Dec. 19, 1978

[54] RETROFOCUS TYPE WIDE ANGLE LENS SYSTEM

[75] Inventor: Kazushi Hyakumura, Hachiouji, Japan

[73] Assignee: Olympus Optical Co., Ltd., Tokyo, Japan

[21] Appl. No.: 784,796

[22] Filed: Apr. 5, 1977

[30] Foreign Application Priority Data

Apr. 6, 1976 [JP] Japan .................. 51-37849

[51] Int. Cl.² .............................. G02B 9/60
[52] U.S. Cl. .................................. 350/216
[58] Field of Search .......................... 350/216

[56] References Cited

U.S. PATENT DOCUMENTS

| 3,731,989 | 5/1973 | Shimizu | 350/216 |
| 3,936,153 | 2/1976 | Ogura | 350/216 |

Primary Examiner—Paul A. Sacher
Attorney, Agent, or Firm—Cushman, Darby & Cushman

[57] ABSTRACT

A retrofocus type wide-angle lens system comprising five components of five lens elements including a front diverging lens group consisting only of a single lens element and a thick positive lens element arranged at the second stage, said lens system being so designed as to have a short total length and favorably correct various aberrations.

4 Claims, 10 Drawing Figures

SPHERICAL ABERRATION
SINE CONDITION
F2.8

ASTIGMATISM
31°

DISTORTION
31°

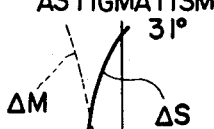
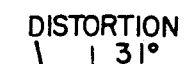
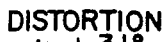

RETROFOCUS TYPE WIDE ANGLE LENS SYSTEM

BACKGROUND OF THE INVENTION (a) Field of the invention:

The present invention relates to a retrofocus type wide-angle lens system having a field angle of approx. 63° and aperture ratio of approx. F/2.8 to be used with a single-lens reflex photographic camera.

(b) Description of the prior art:

Conventional retrofocus type wide-angle lens systems have long total lengths since they comprise a large number of lens components including a front diverging lens group consisting of plural lens components or for some other reasons.

Though retrofocus type wide-angle lens systems which comprise relatively small number of lens components including a front diverging lens group consisting only of a single lens component are conventionally known, there have scarecely known lens systems which are so designed as to have sufficiently short total length.

SUMMARY OF THE INVETION

A general object of the present invention is to provide a compact retrofocus type wide-angle lens system which consists of an extremely small number of lens components, have short total length and wherein various aberrations are favorably corrected.

The lens system according to the present invention has such a composition as shown in FIG. 1 wherein the front diverging lens group consists only of a single negative lens component and a thick positive lens component is arranged at the next stage for correcting aberrations with a small number of lens components. That is to say, said thick positive lens component serves for correcting spherical aberration and coma produced by said negative meniscus lens component used as the front diverging lens group. The lens system according to the present invention comprises five components of five lens elements: a first negative meniscus lens component, a second positive lens component, a third negative lens component, a fourth positive meniscus lens component and a fifth positive lens component. Said lens system satisfies the following conditions:

(1) $|r_3| < |r_1|$ (2) $0.1f < d_4 < 0.15f$ (3) $d_4 < d_5 + d_6 + d_7 + d_8 + d_9 < 1.8 d_4$ (4) $2.5 d_4 < d_3 < 3.5 d_4$ (5) $0.7 d_9 < d_7 < 0.9 d_9$ (6) $0.8 < |r_9|/|r_{10}| < 1.5$ wherein the reference symbols represent as defined below:

$r_1, r_3, r_9, r_{10}$: radii of curvature on the object side surface of the first lens element, object side surface of the second lens element and both surfaces of the fifth lens element $d_3, d_5, d_7, d_9$: thicknesses of the second lens element, third lens element, fourth lens element and fifth lens element $d_4, d_6, d_8$: airspaces between the second, third, fourth and fifth lens elements respectively.

f: focal length of the lens system as a whole

Now, significance of the conditions will be described consecutively. The condition (1) is required, in combination with the condition (6), for correcting distortion. When the condition (1) is not satisfied, negative distortion will be aggravated.

If $d_4$ exceeds the upper limit of the condition (2), oblique rays incident on the third lens element will be too high, thereby requiring a thick rear lens group which is undesirable for designing a compact large aperture lens system. In such a case, it will be also required to minimize power of the third lens element, making it disadvantageous to correct astigmatism and chromatic aberration. When $d_4$ is shorter than the lower limit of the condition (2), negative distorsion will be aggravated and, in addition, it will be difficult to arrange an automatic stop mechanism in the airspace $d_4$.

The condition (3) is effective for correcting spherical aberration. If $d_5 + d_6 + d_7 + d_8 + d_9$ exceeds the upper limit of the condition (3), rays will be too high in the rear lens group, thereby aggravating spherical aberration and prolonging total length of the lens system as a whole. If the above-mentioned total is smaller than the lower limit of the condition (3), it will be obliged to use lens elements too thin to be practically manufactured and rays will be too low on the image side surface $r_6$ of the third lens element and the object side surface $r_7$ of the fourth lens element, thereby making it impossible to design a large aperture lens system.

The condition (4) is necessary for allowing the second lens element to favorably correct spherical aberration and coma produced by the first lens element. If $d_3$ is shorter than the lower limit of the condition (4), it will be impossible to sufficiently correct spherical aberration and coma. When $d_3$ exceeds the upper limit of the condition (4), in contrast, distortion will be overcorrected.

The condition (5) is required for correcting astigmatism and distortion. If $d_7$ is longer than 0.9 $d_9$, astigmatic difference will be aggravated. When $d_7$ is shorter than the lower limit, in contrast, negative distortion will unavoidably remain.

Finally, the condition (6) is important for correcting distortion. If $|r_9|/|r_{10}|$ is smaller than 0.8, negative distortion will be remarkably aggravated. When $|r_9|/|r_{10}|$ is larger than 1.5, in contrast, coma cannot be favorably be corrected and, in addition, spherical aberration will be undercorrected.

Since one of the objects of the present invention is to design a compact lens system, it is required to limit the total of $d_5 + d_6 + d_7 + d_8 + d_9$ below a certain value and to select a small value of $d_8$ accordingly. However, it will be practically impossible to manufacture a lens system if $d_8$ is too short. Therefore, $d_8$ should desirably be selected within the range defined by the conditions (7) below:

(7) $0.0033f < d_8$

BRIEF DESCRIPTION OF THE DRAWINGS

FIG. 3A, FIG. 3B and FIG. 3C show graphs illustrating the aberration characteristics of the Embodiment 2; and FIG. 4A, FIG. 4B and FIG. 4C illustrate graphs showing the aberration characteristics of the Embodiment 3.

DETAILED DESCRIPTION OF THE PREFERRED EMBODIMENTS

Figure 1:
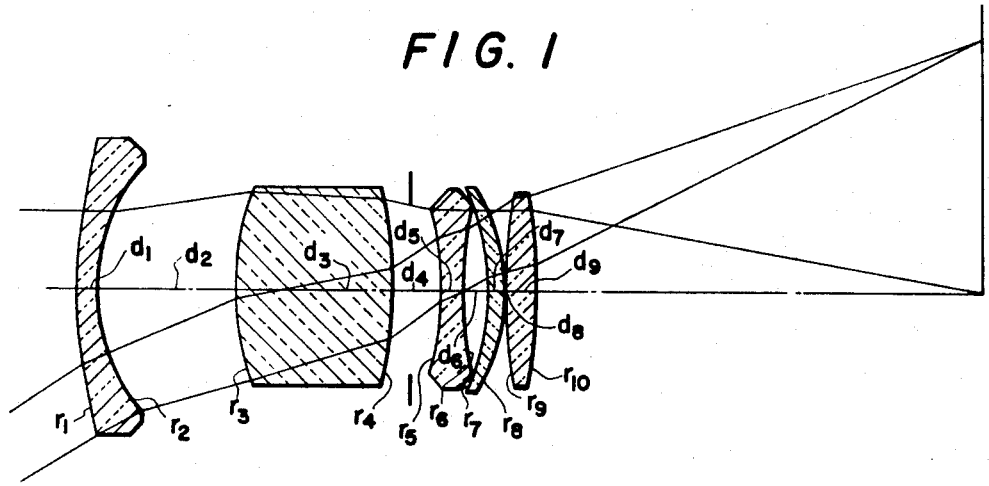
FIG. 1 shows a sectional view illustrating the composition of the lens system according to the present invention.
Figure 2A:
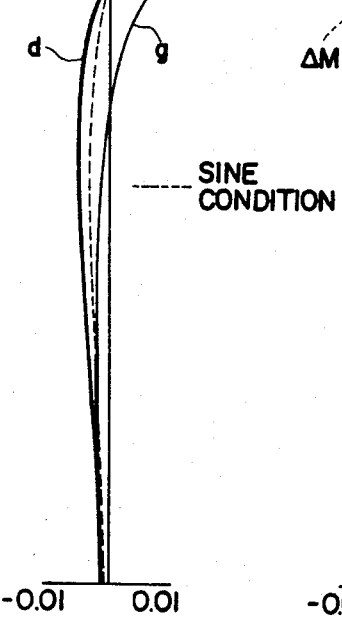
FIG. 2A, FIG. 2B and FIG. 2C show curves illustrating the aberration characteristics of the Embodiment 1.
Figure 2B:
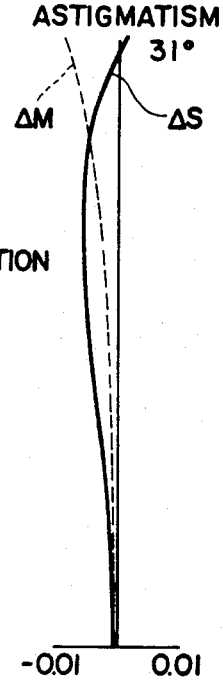
Figure 2C:
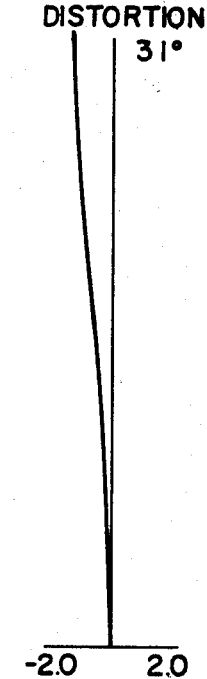

Now, some preferred embodiments of the present invention will be detailedly described below:

| Embodiment 1 | | |
|---|---|---|
| f = 1.0 | F 1 : 2.8 | 2ω = 62° |
| $r_1 = 1.3345$ | | |
| $d_1 = 0.0474$ | $n_1 = 1.51112$ | $\nu_1 = 60.48$ |
| $r_2 = 0.4172$ | | |
| $d_2 = 0.3376$ | | |
| $r_3 = 0.6608$ | | |
| $d_3 = 0.3715$ | $n_2 = 1.72$ | $\nu_2 = 50.25$ |
| $r_4 = -1.3183$ | | |
| $d_4 = 0.1295$ | | |
| $r_5 = -0.5562$ | | |
| $d_5 = 0.0452$ | $n_3 = 1.74077$ | $\nu_3 = 27.79$ |
| $r_6 = 1.2654$ | | |
| $d_6 = 0.0336$ | | |
| $r_7 = -0.7113$ | | |
| $d_7 = 0.0651$ | $n_4 = 1.755$ | $\nu_4 = 52.35$ |
| $r_8 = -0.4177$ | | |
| $d_8 = 0.0043$ | | |
| $r_9 = 2.1907$ | | |
| $d_9 = 0.0678$ | $n_5 = 1.735$ | $\nu_5 = 49.82$ |
| $r_{10} = -1.6429$ | | |
| Embodiment 2 | | |
| f = 1.0 | F 1 : 2.8 | 2ω = 62° |
| $r_1 = 1.4363$ | | |
| $d_1 = 0.0473$ | $n_1 = 1.51112$ | $\nu_1 = 60.48$ |
| $r_2 = 0.4320$ | | |
| $d_2 = 0.3375$ | | |
| $r_3 = 0.6541$ | | |
| $d_3 = 0.3696$ | $n_2 = 1.72$ | $\nu_2 = 50.25$ |
| $r_4 = -1.4488$ | | |
| $d_4 = 0.1299$ | | |
| $r_5 = -0.5445$ | | |
| $d_5 = 0.0445$ | $n_3 = 1.74077$ | $\nu_3 = 27.79$ |
| $r_6 = 1.3184$ | | |
| $d_6 = 0.0394$ | | |
| $r_7 = -0.8118$ | | |
| $d_7 = 0.0690$ | $n_4 = 1.755$ | $\nu_4 = 52.35$ |
| $r_8 = -0.4260$ | | |
| $d_8 = 0.0034$ | | |
| $r_9 = 1.9299$ | | |
| $d_9 = 0.0656$ | $n_5 = 1.735$ | $\nu_5 = 49.82$ |
| $r_{10} = -2.1588$ | | |
| Embodiment 3 | | |
| f = 1.0 | F 1 : 2.8 | 2ω = 62° |
| $r_1 = 1.3386$ | | |
| $d_1 = 0.0473$ | $n_1 = 1.51112$ | $\nu_1 = 60.48$ |
| $r_2 = 0.4211$ | | |
| $d_2 = 0.3375$ | | |
| $r_3 = 0.6631$ | | |
| $d_3 = 0.3716$ | $n_2 = 1.72000$ | $\nu_2 = 50.25$ |
| $r_4 = -1.3343$ | | |
| $d_4 = 0.1295$ | | |
| $r_5 = -0.5614$ | | |
| $d_5 = 0.0453$ | $n_3 = 1.74077$ | $\nu_3 = 27.79$ |
| $r_6 = 1.2640$ | | |
| $d_6 = 0.0431$ | | |
| $r_7 = -0.7151$ | | |
| $d_7 = 0.0556$ | $n_4 = 1.75500$ | $\nu_4 = 52.35$ |
| $r_8 = -0.4181$ | | |
| $d_8 = 0.0042$ | | |
| $r_9 = 2.2636$ | | |
| $d_9 = 0.0665$ | $n_5 = 1.77250$ | $\nu_5 = 49.60$ |
| $r_{10} = -1.7224$ | | |

In the above embodiments, the reference symbols $r_1$ through $r_{10}$ represent radii of curvature on the respective lens surfaces, the reference symbols $d_1$ through $d_9$ designate thickness of the respective lens elements and airspaces there between, the reference symbols $n_1$ through $n_5$ denote refractive indices of the respective lens elements and the reference symbols $\nu_1$ through $\nu_5$ represent Abbe's numbers of the respective lens elements.

As is clearly understood from the foregoing embodiments and the drawings attached hereto, the present invention provides a compact retrofocus type wide-angle lens system which consists of a small number of lens elements and wherein various aberrations are favorably corrected.

I claim:
1. A retrofocus type wide-angle lens system comprising a first negative meniscus lens element, a second positive lens element, a third negative lens element, a fourth positive meniscus lens element and a fifth positive lens element, and said lens system satisfying the following conditions:
   (1) $|r_3| < |r_1|$
   (2) $0.12f < d_4 < 0.13f$
   (3) $1.6d_4 < d_5 + d_6 + d_7 + d_8 + d_9 < 1.8d_4$
   (4) $2.8d_4 < d_3 < 2.9d_4$
   (6) $0.8 < |r_9|/|r_{10}| < 1.4$ wherein, the reference symbols $r_1$, $r_3$, $r_9$ and $r_{10}$ represent radii of curvature on the object side surface of said first lens element, the object side surface of said second lens element and both surfaces of said fifth lens element, the reference symbols $d_3$, $d_5$, $d_7$ and $d_9$ designate thicknesses of the second, third, fourth and fifth lens elements respectively, the reference symbols $d_4$, $d_6$ and $d_8$ denote the airspaces between said second and third lens elements, between said third and fourth lens elements, and between said fourth and fifth lens elements respectively.

2. A retrofocus type wide-angle lens system according to claim 1 having the following numerical data:

| f = 1.0 | F 1 : 2.8 | 2ω = 62° |
|---|---|---|
| $r_1 = 1.3345$ | | |
| $d_1 = 0.0474$ | $n_1 = 1.51112$ | $\nu_1 = 60.48$ |
| $r_2 = 0.4172$ | | |
| $d_2 = 0.3376$ | | |
| $r_3 = 0.6608$ | | |
| $d_3 = 0.3715$ | $n_2 = 1.72$ | $\nu_2 = 50.25$ |
| $r_4 = -1.3183$ | | |
| $d_4 = 0.1295$ | | |
| $r_5 = -0.5562$ | | |
| $d_5 = 0.0452$ | $n_3 = 1.74077$ | $\nu_3 = 27.79$ |
| $r_6 = 1.2654$ | | |
| $d_6 = 0.0336$ | | |
| $r_7 = -0.7113$ | | |
| $d_7 = 0.0651$ | $n_4 = 1.755$ | $\nu_4 = 52.35$ |
| $r_8 = -0.4177$ | | |
| $d_8 = 0.0043$ | | |
| $r_9 = 2.1907$ | | |
| $d_9 = 0.0678$ | $n_5 = 1.735$ | $\nu_5 = 49.82$ |
| $r_{10} = -1.6429$ | | | wherein the reference symbols $r_1$ through $r_{10}$ represent radii of curvature on the respective lens surfaces, the reference symbols $d_1$ through $d_9$ designate thickness of the respective lens elements and airspaces there between, the reference symbols $n_1$ through $n_5$ denote refractive indices of the respective lens elements and the reference symbols $\nu_1$ through $\nu_5$ represent Abbe's numbers of the respective lens elements.

3. A retrofocus type wide-angle lens system according to claim 1 having the following numerical data:

| f = 1.0 | F 1 : 2.8 | 2ω = 62° |
|---|---|---|
| $r_1 = 1.4363$ | | |
| $d_1 = 0.0473$ | $n_1 = 1.51112$ | $\nu_1 = 60.48$ |
| $r_2 = 0.4320$ | | |
| $d_2 = 0.3375$ | | |
| $r_3 = 0.6541$ | | |
| $d_3 = 0.3696$ | $n_2 = 1.72$ | $\nu_2 = 50.25$ |
| $r_4 = -1.4488$ | | |
| $d_4 = 0.1299$ | | |
| $r_5 = -0.5445$ | | |
| $d_5 = 0.0445$ | $n_3 = 1.74077$ | $\nu_3 = 27.79$ |
| $r_6 = 1.3184$ | | |
| $d_6 = 0.0394$ | | |
| $r_7 = -0.8118$ | | |
| $d_7 = 0.0690$ | $n_4 = 1.755$ | $\nu_4 = 52.35$ |
| $r_8 = -0.4260$ | | |
| $d_8 = 0.0034$ | | |
| $r_9 = 1.9299$ | | |
| $d_9 = 0.0656$ | $n_5 = 1.735$ | $\nu_5 = 49.82$ |

-continued $r_{10} = -2.1588$ wherein the reference symbols $r_1$ through $r_{10}$ represent radii of curvature on the respective lens surfaces, the reference symbols $d_1$ through $d_9$ designate thickness of the respective lens elements and airspaces therebetween, the reference symbols $n_1$ through $n_5$ denote refractive indices of the respective lens elements and the reference symbols $\nu_1$ through $\nu_5$ represent Abbe's numbers of the respective lens elements.

4. A retrofocus type wide-angle lens system according to to claim 1 having the following numerical data:

| | | |
|---|---|---|
| $f = 1.0$ | $F\ 1:2.8$ | $2\omega = 62°$ |
| $r_1 = 1.3386$ | | |
| $d_1 = 0.0473$ | $n_1 = 1.51112$ | $\nu_1 = 60.48$ |
| $r_2 = 0.4211$ | | |
| $d_2 = 0.3375$ | | |
| $r_3 = 0.6631$ | | |
| $d_3 = 0.3716$ | $n_2 = 1.72000$ | $\nu_2 = 50.25$ |
| $r_4 = 1.3343$ | | |
| $d_4 = 0.1295$ | | |
| $r_5 = -0.5614$ | | |
| $d_5 = 0.0453$ | $n_3 = 1.74077$ | $\nu_3 = 27.79$ |
| $r_6 = 1.2640$ | | |
| $d_6 = 0.0431$ | | |
| $r_7 = -0.7151$ | | |
| $d_7 = 0.0556$ | $n_4 = 1.75500$ | $\nu_4 = 52.35$ |
| $r_8 = -0.4181$ | | |
| $d_8 = 0.0042$ | | |
| $r_9 = 2.2636$ | | |
| $d_9 = 0.0665$ | $n_5 = 1.77250$ | $\nu_5 = 49.60$ |
| $r_{10} = -1.7224$ | | | wherein the reference symbosl $r_1$ through $r_{10}$ represent radii of curvature on the respective lens surfaces, the reference symbols $d_1$ through $d_9$ designate thickness of the respective lens elements and airspaces therebetween, the reference symbols $n_1$ through $n_5$ denote refractive indices of the respective lens elements and the reference symbols $\nu_1$ through $\nu_5$ represent Abbe's numbers of the respective lens elements.

* * * * *